(12) United States Patent
DiFoggio

(10) Patent No.: US 8,464,790 B2
(45) Date of Patent: Jun. 18, 2013

(54) BRINE SALINITY FROM SOUND SPEED

(75) Inventor: Rocco DiFoggio, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 329 days.

(21) Appl. No.: 12/944,049

(22) Filed: Nov. 11, 2010

(65) Prior Publication Data

US 2011/0114385 A1 May 19, 2011

Related U.S. Application Data

(60) Provisional application No. 61/261,917, filed on Nov. 17, 2009.

(51) Int. Cl.
*E21B 47/01* (2012.01)
*E21B 49/08* (2006.01)
*G01V 1/50* (2006.01)

(52) U.S. Cl.
USPC .................. 166/252.3; 166/177.2; 181/102

(58) Field of Classification Search
USPC ............. 166/252.3, 177.1, 177.2; 181/106, 181/113, 102
See application file for complete search history.

(56) References Cited

U.S. PATENT DOCUMENTS

| | | | |
|---|---|---|---|
| 3,603,145 A | | 9/1971 | Morris |
| 3,648,513 A | * | 3/1972 | Patterson ..................... 73/64.53 |
| 4,587,641 A | | 5/1986 | DiFoggio |
| 4,754,839 A | | 7/1988 | Gold et al. |
| 5,726,951 A | * | 3/1998 | Birchak et al. .................. 367/38 |
| 5,741,962 A | | 4/1998 | Birchak et al. |
| 6,871,713 B2 | | 3/2005 | Meister et al. |
| 6,997,055 B2 | | 2/2006 | DiFoggio |
| 7,024,917 B2 | | 4/2006 | DiFoggio |
| 7,027,928 B2 | | 4/2006 | DiFoggio |
| 7,464,588 B2 | | 12/2008 | Steinsiek |
| 7,614,302 B2 | | 11/2009 | DiFoggio et al. |
| 2004/0045350 A1 | * | 3/2004 | Jones et al. ................. 73/152.23 |
| 2004/0159149 A1 | * | 8/2004 | Williams et al. ........... 73/152.23 |

OTHER PUBLICATIONS

Savitzky, Abraham et al., "Smoothing and Differentiation of Data by Simplified Least Squares Procedures," Analy. Chem., vol. 36, No. 8, pp. 1627-1639 (Jul. 1964).
Batzle, Michael et al., "Seismic Properties of Pore Fluids," Geophysics, vol. 57, No. 11, pp. 1396-1408 (Nov. 1992).
Frenkel, Michael A., et al., "Impact of Array Lateral Logs on Saturation Estimations in Two Exploration Wells from Australia," SPWLA 42nd Annual Logging Symposium, 14 pp. (Jun. 17-20, 2001).
Honarvar, Farhang, et al., "Reference wavelets used for deconvolution of ultrasonic time-of-flight diffraction (ToFD) signals," 17th World Conference on Nondestructive Testing, 9 pp. (Oct. 25-28, 2008).

* cited by examiner

*Primary Examiner* — Kenneth L Thompson
(74) *Attorney, Agent, or Firm* — Mossman Kumar & Tyler PC

(57) ABSTRACT

Temperature and pressure measurements that are made downhole are used to predict a compressional wave velocity for pure water under downhole conditions. The predicted velocity and a measured compressional velocity of a formation brine are used in a non-iterative method to estimate a value of the formation brine salinity that is between 0 and 1.

15 Claims, 3 Drawing Sheets

US 8,464,790 B2

BRINE SALINITY FROM SOUND SPEED

CROSS-REFERENCES TO RELATED APPLICATIONS

This application claims priority from U.S. Provisional Patent Application Ser. No. 61/261,917 filed on 17 Nov. 2009.

BACKGROUND OF THE DISCLOSURE

1. Field of the Disclosure

This disclosure relates generally to oil and gas well logging tools. More particularly, this disclosure relates to tools and methods for estimating the salinity of formation fluids during drilling operations.

2. Description of the Related Art

The method of the present disclosure is directed to measuring the salinity of a formation fluid. In particular the salinity of formation brines is estimated from in situ measurements. During drilling operations, formations along the well borehole may produce substantial quantities of water. The measurement of salinity of the formation brine is important. For instance, some of the formations being drilled may be fresh water, and other formations may produce salt water. It is particularly important when salt water is encountered to provide a means for isolation of salt water so that it does not travel up or down the borehole and invade nearby fresh water or petroleum bearing formations. The drilling fluid, which is ordinarily used in the drilling process, may include substantial portions of water.

Salinity measurements may be used in a variety of applications involving formation evaluation. For example, salinity measurements assist in delineating oil and water and to estimate the moveable oil in a reservoir. Invasion of salt water into a producing borehole may require plugging of original perforations and reperforation at a higher elevation. Salt water is more corrosive than fresh water, so there may be equipment damage.

Prior art methods have used transit time measurements in a borehole fluid along with the assumption that the bulk modulus is linearly related to salinity for estimating borehole fluid salinity. The method requires an iterative method involving experimental calibration of deviations in transit time measurements from that of pure water to get a salinity estimate. See, for example, U.S. Pat. No. 4,754,839 to Gold et al. In the present disclosure, velocity measurements are inverted non-iteratively to provide a salinity estimate.

SUMMARY OF THE DISCLOSURE

One embodiment of the present disclosure is an apparatus configured to evaluate a formation fluid. The apparatus includes: a carrier configured to be conveyed in a borehole in the formation; a transducer on the carrier configured to receive an acoustic pulse in a sample of the formation; and at least one processor configured to use a travel time of the acoustic pulse over a known distance and a predicted value of a velocity of water under borehole conditions, to estimate a salinity of the borehole fluid using a non-iterative method.

Another embodiment of the present disclosure is a method of evaluating a formation fluid. The method includes: conveying a carrier into a borehole; using a transducer on the carrier to receive an acoustic pulse in a sample of the formation fluid; and using at least one processor for estimating a salinity of the sample of the formation fluid using a non-iterative method from a travel time of the acoustic pulse over a known distance in the sample of the formation fluid and a predicted value of a velocity of water under borehole conditions.

BRIEF DESCRIPTION OF THE DRAWINGS

For a detailed understanding of the present disclosure, reference should be made to the following detailed description of the included embodiments, taken in conjunction with the accompanying drawings.

DETAILED DESCRIPTION OF THE DISCLOSURE

Figure 1:
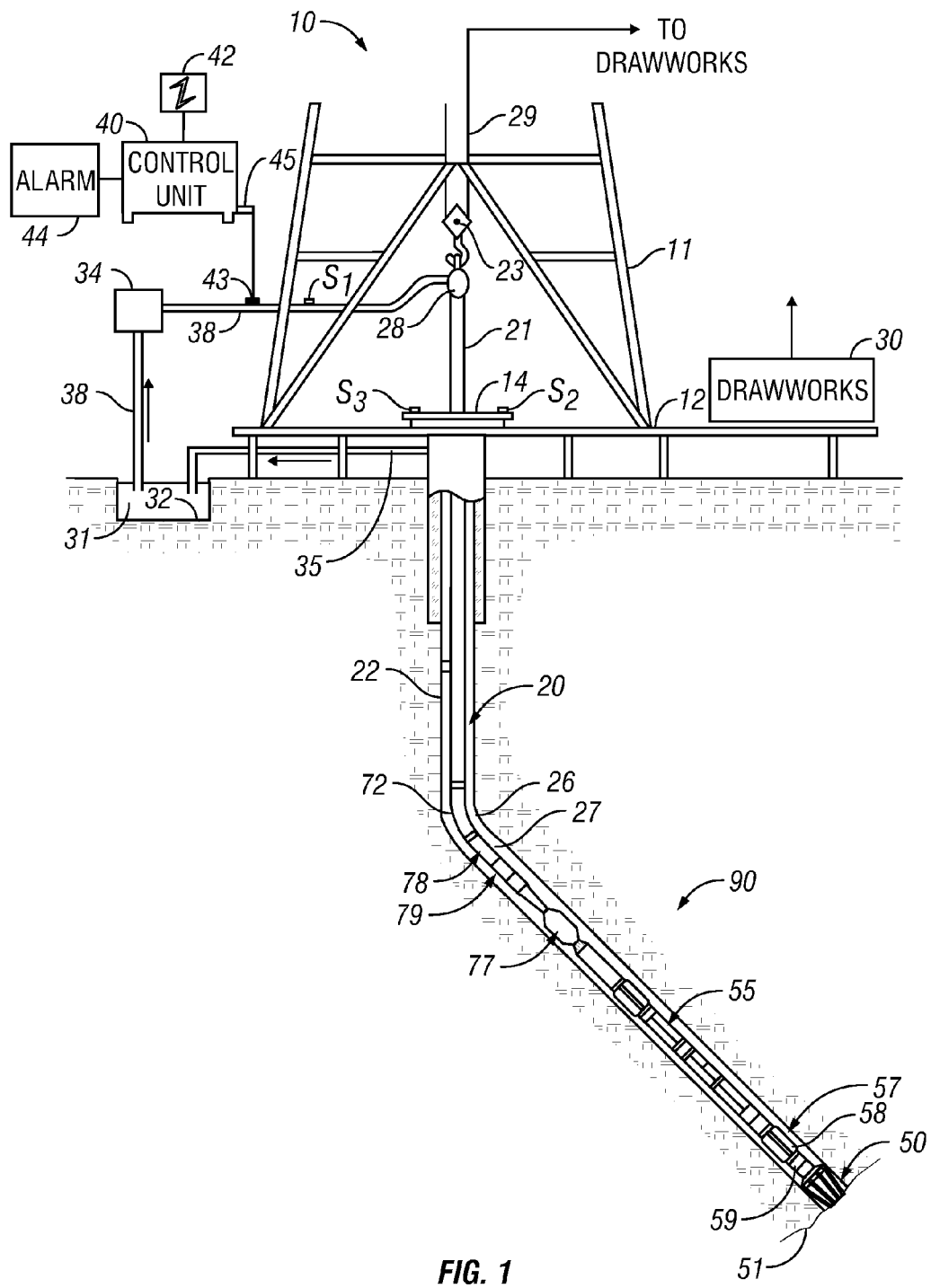
FIG. 1 shows a measurement-while-drilling tool suitable for use with the present disclosure.

FIG. 1 shows a schematic diagram of a drilling system 10 with a drillstring 20 carrying a drilling assembly 90 (also referred to as the bottom-hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubular such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring 20 breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks 30 is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the present disclosure, the drill bit 50 is rotated by only rotating the drill pipe 22. In another embodiment of the present disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the present disclosure, a drilling sensor module 59 is placed near the drill bit 50. The drilling sensor module 59 may contain sensors, circuitry and processing software, and algorithms relating to the dynamic drilling parameters. Such parameters typically include bit bounce, stick-slip of the drilling assembly, backward rotation, torque, shocks, borehole and annulus pressure, acceleration measurements, and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

A novel feature of the system illustrated in FIG. 1 is that the surface processor 40 and/or a downhole processor (not shown) are configured to use measurements provided by various downhole sensors to estimate in real time the salinity of the borehole fluid.

One measurement that is used in the present disclosure is a measurement of a compressional wave velocity of the formation fluid. DiFoggio (U.S. Pat. No. 7,614,302 having the same assignee as the present disclosure and the contents of which are incorporated herein by reference) discloses an arrangement for measuring fluid velocities in a sample chamber on a BHA or a wireline assembly. For MWD applications, formation fluid may be recovered in a sample chamber using, for example, a sampling device disclosed in U.S. Pat. No. 6,871,713 to Meister et al., having the same assignee as the present disclosure and the contents of which are incorporated herein by reference.

Figure 2A:
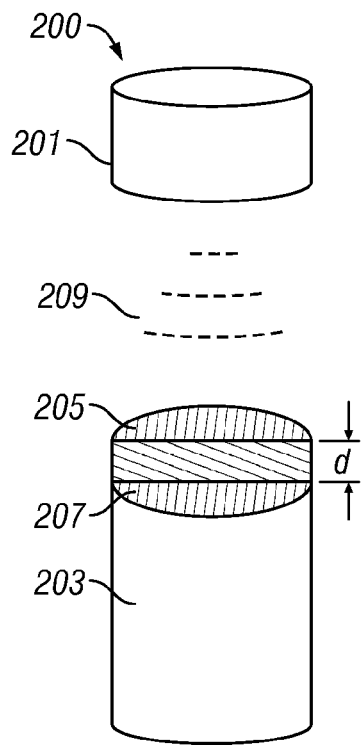
FIG. 2A illustrates the principle of a stepped transducer.
Figure 2B:
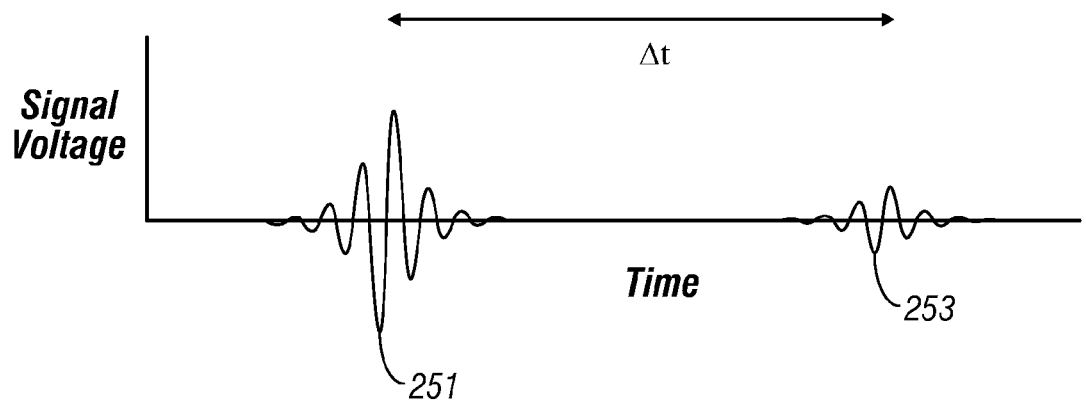
FIG. 2B illustrates an exemplary signal with the stepped transducer of FIG. 2A.

An acoustic sensor assembly 200 used for measuring fluid velocity in the sample chamber is shown in more detail in FIG. 2A. The acoustic sensor assembly 200 comprises a transducer 201 and a stepped reflector 203. The stepped reflector 203 includes a protruding portion 205 and a recessed portion 207 that is a distance "d" further away from a transmitter than is the protruding portion 207. In this example, transducer 201 may serve as transmitter and receiver, however, in some embodiments, the role of transmitter may be performed by a device other than transducer 201. The transmitter generates an acoustic pulse depicted by 209. The stepped reflector 203 produces a signal having two arrivals. The reflected signal received by the transducer 201 is shown in FIG. 2B. The first arrival 251 is a result of the reflection of the pulse 209 at the protruding portion 205 of the reflector. The second arrival 253 is a result of the reflection of the acoustic pulse 209 at the recessed portion 207 of the reflector. The depth of the recess d and the time difference between the two arrivals ΔT gives the velocity of the acoustic pulse in the borehole fluid.

$$v = 2d/\Delta t$$

There are prior art teachings of using travel time measurements over two different distances to estimate the fluid velocity. These suffer from the drawback that two different source pulses are involved, either from two different transducers or from the same transducer at two different times. The two different source pulses inevitably have somewhat different waveforms, so that estimating a difference of the travel times to extremely high precision is limited by the differences between those two source waveforms. This is particularly true whenever the acoustic pulses are transmitted through an attenuative and dispersive medium such as a borehole fluid. With the present transducer, the problem of source waveform variability is eliminated because the arrivals at the two different times, which are being compared, are both echoes of the very same generated acoustic pulse. There are several ways to estimate the travel time difference, Δt.

In one embodiment of the present disclosure, an autocorrelation of the received signal may be performed and a peak value of the autocorrelation gives the travel time. Alternatively, a cross-correlation of two different windows of the received signal may be used, the two different windows being selected based on an expected arrival time for the acoustic pulse in order to avoid spurious aliasing. The spacing of the time channels for collecting the received signal, may affect the travel time resolution. Sub-channel resolution may be obtained by interpolating, the peak position between time channels or other techniques known to those of skill in the art. The conceptual basis for sub-channel resolution is to fit a polynomial to the autocorrelation function in the neighborhood of the peak and then to find the zero crossing (the root) of the first derivative of that polynomial, which is the interpolated peak position. Because the time channels were uniformly spaced, a Savitzky Golay method may be used to compute the first derivative, f', of the fitting polynomial at two time steps (the one just left and the one just right of the peak), and then to perform linear interpolation of the first derivative to obtain its zero crossing, which is the interpolated peak position, $x_P$. That is, $f'(x_L)/[-f'(x_R)] = d_L/d_R$, where $d_L = x_P - x_L$ and $d_R = x_R - x_P$ and $d_L + d_R = x_R - x_L$. Of course, quadratic interpolation or iterative root finding could also have been used to find $x_P$. Using such correlation and sub-channel interpolation methods, the transducer structure of FIG. 2A may provide measurements of velocity in water with a precision of at least 25 parts per million (ppm).

The estimate of the travel time may also be obtained using deconvolution methods. In one embodiment of the present disclosure, a Wiener deconvolution of the second arrival of the received signal may be performed using, as a reference wavelet, the first arrival. See Honvarvar et al. (2008). Disclosed therein is the use of an angle-dependent deconvolution technique in which the reference wavelet used for processing each part of the signal is different from wavelets used for other parts.

In another embodiment of the present disclosure, a travel time is measured for the reflection from the protruding portion of the reflector. This may be done if the reflection from the recessed portion is too weak or detection of the reflection from the recessed portion is otherwise difficult to detect. In such a case, the distance between the transmitter and the protruding portion of the reflector may be used. A single reflection may also be used with a transducer assembly that has a flat reflector. In such situations, the estimate of the travel time may be improved using the method disclosed in DiFoggio. Specifically, the raw amplitude data may be first processed by applying a digital bandpass filter to reject any frequencies that are not close to the acoustic source frequency. For example, for a 10 MHz acoustic source and a 40 MHz sampling frequency, one could apply a 9-11 MHz digital bandpass filter. Next, one may compute the square of the amplitude at each sampling time, which corresponds to the energy received at that time. Then, one may generate a cumulative sum of squares (CSS) of these amplitudes, which is the cumulative sum of energy received up until that time. The digital bandpass filtering and cumulative sum of squares have already smoothed the raw data and removed some noise. The filtered cumulative sum of squares data may be further smoothed (and first and second derivatives of the CSS obtained) using the Savitzky-Golay method (Savitzky and Golay, Analytical Chemistry, Vol. 36, No. 8, Jul. 1964). The first derivative of CCS generates a series of Gaussian-looking peaks. The second derivative of the CSS are the first derivatives of the Gaussian peaks, whose zero crossings (roots) represent the interpolated peak positions. Smoothing the data and the utilization of the Savitzky-Golay method may reduce noise from the desired signal.

The present method may use, in addition to velocity (or transit time) measurements in the borehole fluid, pressure and temperature measurements. Devices for measuring borehole fluid temperature and pressure would be known to those versed in the art and are not discussed herein, except to state that they may be positioned proximate to the acoustic transducer assembly 203.

The present disclosure may use, but is not limited to, two empirical relationships. The first is for the compressional velocity of water as a function of temperature and density from Batzle (1992):

$$V_{water} = \sum_{i=0}^{4}\sum_{j=0}^{3} w_{ij} T^i P^j, \quad (1)$$

where $V_{water}$ is the speed of sound in pure water (0 ppm salinity) in units of meters per second, T is the temperature in degrees Celsius, P is the pressure in MegaPascal, and $w_{ij}$ are empirical weighting factors. Eqn. (1) is a fourth order polynomial in temperature and a third order polynomial in pressure, given by Wilson (1959). The constants derived by Wilson and reproduced in Batzle are given in Table I.

TABLE I

Coefficients for water properties computation

| i | j |  |  |  |
|---|---|---|---|---|
|   | 0 | 1 | 2 | 3 |
| 0 | 1402.85 | 1.524 | $3.437 \times 10^{-3}$ | $-1.197 \times 10^{-5}$ |
| 1 | 4.871 | -0.0111 | $1.739 \times 10^{-4}$ | $-1.628 \times 10^{-6}$ |
| 2 | -0.04783 | $2.747 \times 10^{-4}$ | $-2.135 \times 10^{-6}$ | $1.237 \times 10^{-8}$ |
| 3 | $1.487 \times 10^{-4}$ | $-6.503 \times 10^{-7}$ | $-1.455 \times 10^{-8}$ | $1.327 \times 10^{-10}$ |
| 4 | $-2.197 \times 10^{-7}$ | $7.987 \times 10^{-10}$ | $5.230 \times 10^{-12}$ | $-4.614 \times 10^{-13}$ |

The second relationship given by Batzle is:

$$V_B = V_W + S(1170 - 9.6T + 0.055T^2 - 8.5 \times 10^{-5}T^3 + 2.6P - 0.0029TP - 0.0476P^2) + S^{1.5}(780 - 10P + 0.16P^2) - 1820S^2 \quad (2)$$

where $V_b$ is the compressional wave velocity for a brine having a salinity, S. There is a well known typographical error in Batzle in which the last term in $S^2$ is shown as having a coefficient of -820 instead of the correct value of -1820, which is shown here.

At first glance, it would appear that eqns. (1) and (2) can be solved using iterative methods to estimate a brine salinity, S, for a given measurement of $V_b$ at a temperature T and pressure P. However, those versed in the art would recognize that an equation such as eqn. (2) has multiple solutions and iterative gradient methods may not converge to the correct solution.

A novel feature of the present disclosure is the recognition that eqn. (2) is amenable to an analytic solution. By making the substitution $x=\sqrt{S}$, eqn. (2) becomes:

$$0 = (V_{water} - V_b) + x^2(1170 - 9.6\,T + 0.55\,T^2 - 8.5 \times 10^{-5}\,T^2 + 2.6\,P - 0.0029\,TP - 0.476\,P^2) + x^3(780 - 10\,P + 0.16\,P^2) - 1820x^4 \quad (3).$$

Eqn. (3) is a quartic equation in x which can be solved by standard methods to give four solutions for x. The negative, imaginary, or out of range (salinity less than zero or greater than 100%) roots are then ignored and the remaining, real, in-range root is the solution. Thus, there is a unique solution having a value S such that $0 \leq S \leq 1$ that is obtained non-iteratively.

Figure 3:
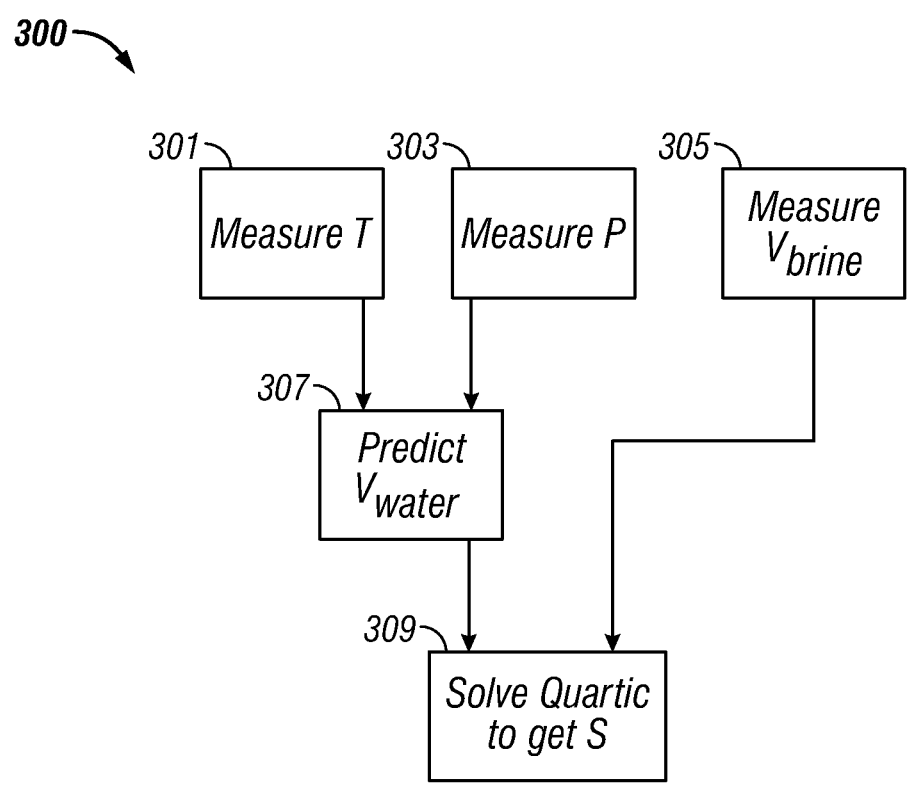
FIG. 3 is a flow chart illustrating the method of the present disclosure.

FIG. 3 is a flow chart outlining an exemplary method 300. In steps 301 and 303, temperature and pressure measurements of the borehole fluid, respectively, may be obtained using known prior art sensors. In step 307, for MWD applications, a downhole processor may be used to implement eqn. (1) to give a predicted value of $V_{water}$. Alternatively, temperature and pressure measurements may be telemetered uphole and a surface processor used to predict $V_{water}$. In step 305, a measurement may be made of the borehole fluid velocity $V_{br}$. This may be done using the apparatus described above, though that is not to be construed as a limitation. A measurement of $V_{br}$ may be made by any suitable device.

In step 309, the downhole (or surface) processor then uses the predicted $V_{water}$ and the measured $V_{br}$ to solve for an in-range estimate of salinity, S. As noted above, there is a unique in-range solution. The estimated saturation may then be used for reservoir evaluation and development as described in the Background.

While the present disclosure discusses exemplary MWD applications, it is not intended to be a limitation. The methods described above may be used with an acoustic sensor that measures fluid velocities inside a sample chamber on a downhole logging tool conveyed on a wireline. For the purposes of the present disclosure, the BHA and a wireline-conveyed instrument may be referred to as a downhole assembly.

The processing of the data may be accomplished by a downhole processor. Alternatively, measurements may be stored on a suitable memory device and processed upon retrieval of the memory device for detailed analysis. Implicit in the control and processing of the data is the use of a computer program on a suitable machine readable medium that enables the processor to perform the control and processing. The machine readable medium may include ROMs, EPROMs, EAROMs, Flash Memories and Optical disks. All of these media have the capability of storing the data acquired by the logging tool and of storing the instructions for processing the data. It would be apparent to those versed in the art that due to the amount of data being acquired and processed, it is impossible to do the processing and analysis without use of an electronic processor or computer.

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. An apparatus configured to evaluate a formation fluid, the apparatus comprising:
   a carrier configured to be conveyed in a borehole in the formation;
   a sample chamber for receiving a sample of the formation fluid;
   a transducer on the carrier configured to receive an acoustic pulse from a sample of the formation fluid in the sample chamber; and
   at least one processor configured to use:
      (I) a travel time of the acoustic pulse over a known distance, and
      (II) a predicted value of a velocity of water under borehole conditions, to estimate a salinity of the formation fluid using a non-iterative method.

2. The apparatus of claim 1 wherein the at least one processor is further configured for at least one of: (i) reservoir evaluation, and (ii) reservoir development.

3. The apparatus of claim 1 wherein the transducer is part of a transducer assembly further comprising a first reflector and a second reflector and wherein the known distance further comprises a distance between the first reflector and the second reflector.

4. The apparatus of claim 1 further comprising a temperature sensor and a pressure sensor and wherein the at least one processor is further configured to obtain the predicted value as a polynomial function of an output of the pressure sensor and \an output of the temperature sensor.

5. The apparatus of claim 1 wherein the at least one processor is further configured to non-iteratively estimate the salinity of the borehole fluid solving a quartic equation.

6. The apparatus of claim 1 wherein the carrier is part of a downhole assembly selected from: (i) a bottomhole assembly conveyed on a drilling tubular, and (ii) a logging instrument conveyed on a wireline.

7. The apparatus of claim 1, wherein the transducer is configured to transmit the acoustic pulse.

8. A method of evaluating a formation fluid, the method comprising:
   conveying a carrier into a borehole;
   using a transducer on the carrier to receive an acoustic pulse from a sample of the formation fluid in a sample chamber; and
   using at least one processor for estimating a salinity of the formation fluid using a non-iterative method from a travel time of the acoustic pulse over a known distance in the sample of the formation fluid and a predicted value of a velocity of water under borehole conditions.

9. The method of claim 8 further comprising using the at least one processor for at least one of: (i) reservoir evaluation, and (ii) reservoir development.

10. The method of claim 8 wherein the transducer is part of a transducer assembly further including a first reflector and a second reflector and wherein using the traveltime of the acoustic pulse over the known distance further comprises using a distance between the first reflector and the second reflector.

11. The method of claim 8 further obtaining the predicted value as a polynomial function of an output of a pressure sensor and an output of a temperature sensor.

12. The method of claim 8 further comprising non--iteratively estimating the salinity of the borehole fluid solving a quartic equation.

13. The method of claim 8 further comprising using, for the carrier, one of:
   (i) a bottomhole assembly conveyed on a drilling tubular, and (ii) a logging instrument conveyed on a wireline.

14. The method of claim 8, further comprising generating the acoustic pulse.

15. An apparatus configured to evaluate a formation fluid, the apparatus comprising:
   a carrier configured to be conveyed in a borehole in the formation;
   a transducer on the carrier configured to receive an acoustic pulse from a sample of the formation fluid; and
   at least one processor configured to use:
      (I) a travel time of the acoustic pulse over a known distance, and
      (II) a predicted value of a velocity of water under borehole conditions, to estimate a salinity of the formation fluid using a non-iterative method;
   wherein the transducer is part of a transducer assembly further comprising a first reflector and a second reflector, and wherein the known distance further comprises a distance between the first reflector and the second reflector.

* * * * *